C. F. BEARICKS.
FLEXIBLE STAY BOLT.
APPLICATION FILED OCT. 26, 1915.
1,197,434.
Patented Sept. 5, 1916.
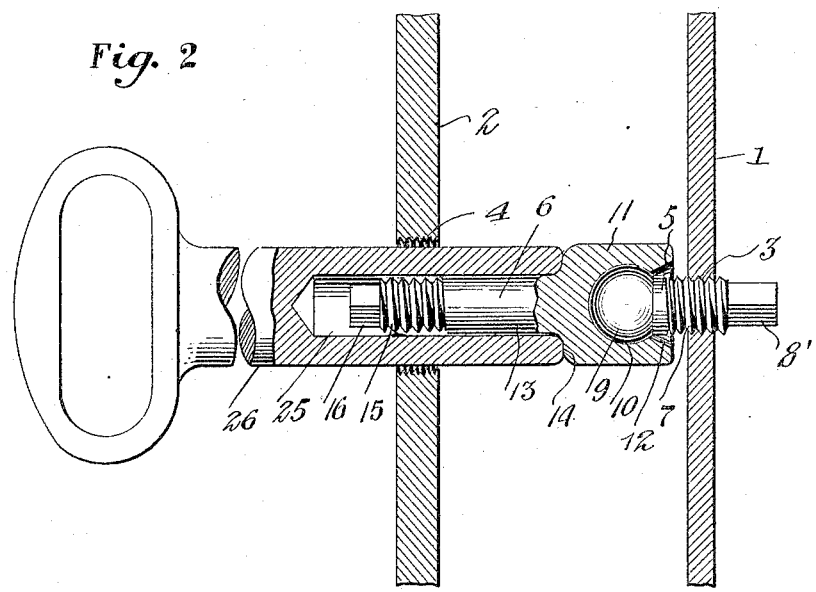
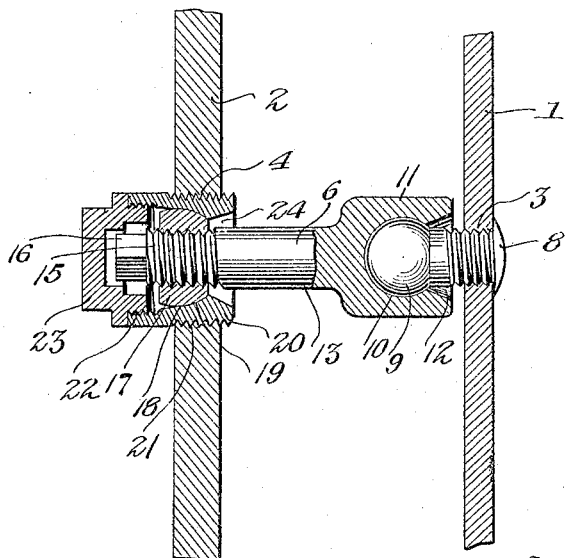
Inventor
Charles F. Bearicks
By Victor J. Evans
Attorney
Witnesses
C. J. Maddox

UNITED STATES PATENT OFFICE.

CHARLES F. BEARICKS, OF YOAKUM, TEXAS.

FLEXIBLE STAY-BOLT.

1,197,434.  Specification of Letters Patent.  Patented Sept. 5, 1916.

Application filed October 26, 1915. Serial No. 57,999.

*To all whom it may concern:*

Be it known that I, CHARLES F. BEARICKS, a citizen of the United States, residing at Yoakum, in the county of Lavaca and State of Texas, have invented new and useful Improvements in Flexible Stay-Bolts, of which the following is a specification.

This invention relates to improvements in flexible stay bolts or radial stays for locomotive and fire-box boilers.

One object of the invention is to provide a flexible stay bolt having a flexible joint connection with the outer sheet and also a flexible joint connection with the inner sheet, whereby a wide range of flexibility of the bolt is permitted to prevent breaking of the bolt due to expansion and contraction of the inner sheet.

A further object of the invention is to provide a stay bolt consisting of sections, one of which is rigidly attached to the inner sheet and flexibly coupled to the other section, and wherein the construction is such as to adapt the second-named bolt section to be engaged by a dolly bar or anvil bar, whereby the bolt section attached to the inner sheet may be firmly headed.

The invention consists of the features of construction, combination and arrangement of parts herein fully described and claimed, reference being had to the accompanying drawing in which:—

Figure 1 is a sectional view through the inner and outer sheets of a boiler and showing the application of my improved stay bolt. Fig. 2 is a similar view illustrating the use of the dolly bar or anvil bar during the process of forming a head upon the bolt section connected with the inner or fire-box sheet.

Referring to the drawing, 1 designates the inner or fire box sheet and 2 the outer sheet of a locomotive or fire-box boiler. These sheets are respectively provided with threaded openings 3 and 4, said openings being coaxially arranged, but the opening 4 being of materially greater diameter than the opening 3.

The bolt comprises a short, minor or inner section 5 and a long, major or outer section 6. The section 5 is provided with a threaded stem or shank 7 which fits within the opening 3 and is headed at its outer end, as shown at 8, the inner end of said bolt terminating in a ball or spherical head 9. The head 9 is formed to fit within a socket 10 in an enlargement or socket member 11 upon the inner end of the bolt section 6, the socket 10 communicating with a flaring passage 12 through which the bolt shank extends, and which permits of a desired amplitude of flexible motion of the bolt sections upon one another. The socket member 11 may be bifurcated and have its socket 10 open at the sides to permit the bolt section 6 to be engaged with and disengaged from the bolt section 5 by a relatively lateral movement, or it may be of any other preferred form. In the use of the bifurcated construction it will of course be understood that the open sides of the socket will be in a plane at right angles to the flexing motion due to the expansion and contraction of the sheet.

The socket member 11 is of greater diameter than the shank or stem 13 of the bolt section 6 to provide a shoulder or abutment surface 14, for a purpose hereinafter described, and the outer end of said bolt section is formed with a threaded portion 15 and an angular extremity 16. The threaded portion 15 is engaged by a retaining nut 17, which is externally of partially spherical form, as shown at 18, to fit within a correspondingly shaped socket 19 in a thimble or bushing sleeve 20, through which thimble the outer portion of the bolt section 13 extends. The thimble is externally threaded at its inner end, as at 21, to engage the threaded wall of the opening 4 and is internally threaded at its outer end, as shown at 22 to receive and engage the inner externally threaded end of a cap nut 23, which nut is hollowed or chambered to receive the angular end 16 of the bolt. The inner end of the thimble passage is flared, as at 24, to permit the bolt member 6 to have free pivotal movements, in which the nut 17 turns in the concaved seat 19.

By the construction described, it will be seen that the bolt section 6 has a pivotal connection with the wall 1, through a medium of the ball and socket coupling between the bolt sections, as well as a pivotal connection with the wall 2 through the medium of the nut 17 and the thimble, by which the range of flexibility of the bolt is materially increased over those having but a single pivotal connection, so that relative expansion and contraction to a very large degree between the walls may occur without injuring the bolt or its fastening connections.

In its primary condition the outer end of the bolt section 5 is formed with an angular portion 8′, by means of which a wrench or like tool may be applied thereto to thread said bolt section within the opening 3. This angular portion 8′ with the projecting portion of the threaded surface of the bolt section 5, is then offset or hammered down to form a head 8, which is of quite large area in order to obviate any tendency to weakness of the connection. By providing the enlargement or socket 11 with its shoulder 14, provision is made for the reception of the bolt within the hollowed or socketed end 25 of a dolly bar or anvil bar 26, which may be inserted through the opening 4, after the bolt sections are introduced, to surround and center and support the bolt section 6 and bear upon the head 14, so as to serve as a brace or anvil head to sustain the shocks and jars upon the surface 8′ in forming the rivet 8, thereby enabling the section 5 to be firmly riveted in position. The tool 26 is then removed, the thimble 20 inserted, the nut 17 applied and turned up to proper position by rotation of the bolt section 6, and the cap 23 then applied to close the outer end of the thimble.

I claim:—

In a flexible stay bolt, the combination of spaced inner and outer sheets provided with threaded openings, the threaded opening in the outer sheet being of greater diameter than the threaded opening in the inner sheet, a bolt section having a threaded portion engaging the threaded opening in the inner sheet and riveted, said bolt section being provided with a spherical head, a thimble engaging the opening in the outer sheet, a second bolt section having a stem provided with an outer threaded end disposed within the thimble, and formed at its inner end with a socket open at its outer end and pivotally receiving said spherical head and presenting an abutment shoulder at the juncture of its inner end with said stem, a nut engaging the threaded end of the second named bolt section and having pivotal connection with the thimble, and a closure for the outer end of the thimble.

In testimony whereof I affix my signature in presence of two witnesses.

CHARLES F. BEARICKS.

Witnesses:
 GEORGE BETHEL,
 ARTHUR BEARICKS.

Copies of this patent may be obtained for five cents each, by addressing the "Commissioner of Patents, Washington, D. C."